United States Patent
Burckart et al.

(10) Patent No.: US 9,426,201 B2
(45) Date of Patent: Aug. 23, 2016

(54) TRANSFORMING APPLICATION CACHED TEMPLATE USING PERSONALIZED CONTENT

(71) Applicant: International Business Machines Corporation, Armonk, NY (US)

(72) Inventors: Erik J. Burckart, Raleigh, NC (US); Dinakaran Joseph, Apex, NC (US); Todd E. Kaplinger, Raleigh, NC (US); Victor S. Moore, Lake City, FL (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 13/801,924

(22) Filed: Mar. 13, 2013

(65) Prior Publication Data

US 2014/0280743 A1 Sep. 18, 2014

(51) Int. Cl.
| | | |
|---|---|---|
| *G06F 17/00* | (2006.01) | |
| *H04L 29/08* | (2006.01) | |
| *G06F 17/30* | (2006.01) | |
| *G06F 17/24* | (2006.01) | |

(52) U.S. Cl.
CPC .............. *H04L 67/02* (2013.01); *G06F 17/248* (2013.01); *G06F 17/30867* (2013.01); *H04L 67/2823* (2013.01)

(58) Field of Classification Search
CPC .................................................... G06F 17/248
See application file for complete search history.

(56) References Cited

U.S. PATENT DOCUMENTS

| | | |
|---|---|---|
| 6,980,175 B1 | 12/2005 | Narayanaswami |
| 7,343,559 B1 | 3/2008 | Fujita et al. |
| 7,386,786 B2 | 6/2008 | Davis et al. |
| 7,788,577 B2 | 8/2010 | Lueck |
| 7,911,409 B1 | 3/2011 | Chatterjee et al. |
| 8,073,895 B2 | 12/2011 | Hamzeh et al. |
| 8,627,216 B2 | 1/2014 | Brichford et al. |
| 8,694,925 B1 | 4/2014 | Beust et al. |
| 2002/0054126 A1 | 5/2002 | Gamon |
| 2004/0148571 A1 | 7/2004 | Lue |
| 2004/0172637 A1 | 9/2004 | Koutyrine |
| 2004/0209607 A1 | 10/2004 | Stepanich et al. |
| 2005/0091576 A1 | 4/2005 | Relyea et al. |
| 2006/0062362 A1 | 3/2006 | Davis |
| 2006/0085741 A1 | 4/2006 | Weiner et al. |
| 2006/0288280 A1 | 12/2006 | Makela |
| 2007/0130525 A1 | 6/2007 | Murphy et al. |
| 2007/0220507 A1 | 9/2007 | Back et al. |
| 2007/0239726 A1 | 10/2007 | Weiss et al. |
| 2008/0072139 A1 | 3/2008 | Salinas et al. |

(Continued)

OTHER PUBLICATIONS

Wieland, "Design and Implementation of a Gateway for Web-based Interaction and Management of Embedded Devices", Mar. 30, 2009, p. 1-101.*

(Continued)

*Primary Examiner* — Amelia Tapp
(74) *Attorney, Agent, or Firm* — Scully, Scott, Murphy & Presser PC; Jinesh P. Patel, Esq.

(57) ABSTRACT

Mechanisms are provided to implement a customizable mobile application utilizing a local template to personalize data. In one example, a local client application on a mobile device automatically changes the local content by utilizing a locally cached template and REST service supported by a remote application. In another example, the template further supports multiple phases of personalization.

20 Claims, 9 Drawing Sheets

(56) References Cited

U.S. PATENT DOCUMENTS

| | | | |
|---|---|---|---|
| 2009/0013037 A1* | 1/2009 | Bodmer | G06Q 30/02 709/203 |
| 2009/0125533 A1 | 5/2009 | Calbucci | |
| 2009/0132572 A1 | 5/2009 | Massie et al. | |
| 2009/0204481 A1 | 8/2009 | Navar et al. | |
| 2009/0327399 A1 | 12/2009 | Dorbes et al. | |
| 2010/0064209 A1 | 3/2010 | Wielgosz et al. | |
| 2010/0145946 A1 | 6/2010 | Conrad et al. | |
| 2010/0169761 A1 | 7/2010 | Lee et al. | |
| 2010/0174974 A1 | 7/2010 | Brisebois et al. | |
| 2010/0199197 A1 | 8/2010 | Faletski et al. | |
| 2011/0047557 A1* | 2/2011 | Koskimies | G06F 9/4843 719/315 |
| 2011/0047577 A1* | 2/2011 | Modi et al. | 725/47 |
| 2011/0287750 A1 | 11/2011 | Watanabe et al. | |
| 2012/0060087 A1 | 3/2012 | Jame et al. | |
| 2012/0102429 A1 | 4/2012 | Naderi et al. | |
| 2012/0131446 A1 | 5/2012 | Park | |
| 2012/0131683 A1* | 5/2012 | Nassar | G06F 17/301 726/28 |
| 2012/0159380 A1 | 6/2012 | Kocienda et al. | |
| 2013/0013921 A1 | 1/2013 | Bhathena et al. | |
| 2013/0086639 A1 | 4/2013 | Sondhi et al. | |
| 2013/0091439 A1 | 4/2013 | Sirpal et al. | |
| 2013/0174015 A1 | 7/2013 | Jeff | |
| 2013/0227078 A1 | 8/2013 | Wei et al. | |
| 2013/0302005 A1 | 11/2013 | Harwell | |

OTHER PUBLICATIONS

Hamad, et al., "Performance Evaluation of RESTful Web Services for Mobile Devices" International Arab Journal of e-Technology, vol. 1, No. 3, Jan. 2010, p. 72-78.*

U.S. Office Action dated Apr. 3, 2015 issued in U.S. Appl. No. 13/801,820, 31 pages.

U.S. Office Action dated Apr. 3, 2015 issued in U.S. Appl. No. 14/079,209, 23 pages.

U.S. Office Action dated Jul. 2, 2015 issued in U.S. Appl. No. 13/801,848, 26 pages.

U.S. Office Action dated Jul. 13, 2015 issued in U.S. Appl. No. 14/079,031, 23 pages.

"Personalization Toolkit Workflow & Authorization Management", GXD00019_en, version 1.10, GX WebManager 9.11.0 and higher, Jan. 11, 2010, pp. 1-41.

Rykowski, J. et al., "Personalization of Information Delivery by the Use of Agent", 2003, pp. 1056-1059.

Sarah Allen et al., PhoneGap, Pro Smartphone Cases—Platform Development 2010, Part 2, p. 131-152, DOI: 10.1007/978-1-4302-2869-1_8.

Myer, T., "Beginning PhoneGap", John Wiley & Sons, Inc, (Dec. 2011), 9 pages.

Yu Ping et al., Transforming legacy web applications to the MVC architecture, Proceedings of the eleventh annual international workshop on Software Technology and Engineering Practice (STEP 2004), Dec. 2004, DOI: 10.1109/STEP.2003.35, Date of Conference: Sep. 19-21, 2003, 10 pages.

http://docs.phonegap.com/en/2.3.0/index.html, "Apache Cordova API Documentation" printed Feb. 12, 2013 1 page.

http://alebelcor.blogspot.com/2011/10/html5-apis.html, "HTML5 APIs" printed Feb. 12, 2013 4 pages.

http://en.wikipedia.org/wiki/PhoneGap, "PhoneGap" printed Feb. 7, 2013 5 pages.

http://www.htmltemplates.net/, "HTML Templates", printed Feb. 4, 2013 2 pages.

U.S. Office Action dated Jul. 13, 2015 issued in U.S. Appl. No. 14/079,031.

Camden, R., "Converting a dynamic web site to a PhoneGap application", http://www.raymondcamden.com/2012/05/05/converting-a-dynamic-web-site-to-a-phonegap-application, (May 5, 2012), Retrieved on Aug. 19, 2015 pp. 1-13.

Lees, A., "Launch a website as a mobile app using PhoneGap/Apache Cordova", http://antonylees.blogspot.com/2013/02/launch-website-as-mobile-app-using.html, (Feb. 27, 2013), Retrieved on Aug. 19, 2015 pp. 1-8.

U.S. Office Action dated Aug. 27, 2015 issued in U.S. Appl. No. 13/801,820. 33 pages.

U.S. Office Action dated Aug. 20, 2015 issued in U.S. Appl. No. 14/079,194. 23 pages.

U.S. Office Action dated Aug. 27, 2015 issued in U.S. Appl. No. 14/079,100. 25 pages.

U.S. Office Action dated Sep. 2, 2015 issued in U.S. Appl. No. 14/079,209. 30 pages.

U.S. Office Action dated Oct. 1, 2015 issued in U.S. Appl. No. 13/801,830 35 pages.

U.S. Office Action dated Oct. 6, 2015 issued in U.S. Appl. No. 14/070,019 25 pages.

U.S. Office Action dated Oct. 1, 2015 issued U.S. Appl. No. 13/801,892 37 pages.

Office Action dated Feb. 1, 2016 received in U.S. Patent Application, namely U.S. Appl. No. 13/801,848, pp. 1-32.

Office Action dated Feb. 1, 2016 received in U.S. Patent Application, namely U.S. Appl. No. 14/079,031, pp. 1-27.

Office Action dated Dec. 30, 2015 received in US. Patent Application, namely U.S. Appl. No. 14/079,209, pp. 1-33.

Office Action dated Dec. 31, 2015 received in US. Patent Application, namely U.S. Appl. No. 13/801,820, pp. 1-35.

Andreucci, G., "Pro iOS Geo: Building Apps with Location Based Services", publication date: Jan. 30, 2013, pp. 1-9, URL:<http://techbus.safaribooksonline.com/book/programming/mobile/9781430247043/chapter-7-creating-hybrid-app>.

Office Action dated May 5, 2016, received in U.S. Appl. No. 13/801,830, 28 pages.

Office Action dated May 6, 2016, received in U.S. Appl. No. 14/070,019, 25 pages.

* cited by examiner

TRANSFORMING APPLICATION CACHED TEMPLATE USING PERSONALIZED CONTENT

CROSS-REFERENCE TO RELATED APPLICATIONS

The present application is related to commonly-owned, co-pending U.S. patent application Ser. No. 13/801,830 entitled, "MOBILE ENABLEMENT OF EXISTING WEB SITES", filed Mar. 13, 2013; U.S. patent application Ser. No. 13/801,820 entitled, "MOBILE ENABLEMENT OF WEB PAGES", filed on Mar. 13, 2013; U.S. patent application Ser. No. 13/801,848 entitled, "MOBILIZING A WEB APPLICATION TO TAKE ADVANTAGE OF A NATIVE DEVICE CAPABILITY", filed on Mar. 13, 2013; and U.S. patent application Ser. No. 13/801,892 entitled, "ENHANCED MOBILIZATION OF EXISTING WEB SITES", filed on Mar. 13, 2013, the entire contents and disclosures of which are expressly incorporated by reference herein as if fully set forth herein.

BACKGROUND

The present disclosure relates generally to an environment where an application has cached hyper text markup language (HTML), cascading style sheets (CSS) and/or JavaScript in support of providing a low latency rich user environment including interactions with a backend server for dynamic content and Representational State Transfer (REST) requests.

In such an environment, the application is typically installed with a variety of HTML, extensible markup language (XML), extensible hypertext markup language (XHTML), CSS, JavaScript, images, and other documents—helping provide a desired web experience. However, a conventional application will typically be installed with a non-personalized set of artifacts (that is, resources). The application is then limited as to what kind of user experience it can provide.

Other systems (such as those utilized by developers building applications based on PHONEGAP™) also bundle local web artifacts on mobile devices while making REST calls to remote services for dynamic or real time data.

SUMMARY

In one example, the present disclosure relates to the field of transforming cached templates for personalized use.

In one specific example, one or more systems may provide for automatically transforming cached templates for personalized use. In another example, one or more methods may provide for automatically transforming cached templates for personalized use. In another example, one or more algorithms may provide for automatically transforming cached templates for personalized use.

In one embodiment, a computer readable storage medium, tangibly embodying a program of instructions executable by the computer for providing a template to be personalized by a mobile device in cooperation with a server is provided, the program of instructions, when executing, performing the following steps: generating the template including local content; identifying in the template at least one location where a placeholder is to be added to indicate where dynamic content is to be inserted; adding the placeholder at the identified location in the template; and generating one or more representational state transfer services to be used to apply the dynamic content to the placeholder by the mobile device in cooperation with the server.

In another embodiment, a method for providing a template to be personalized by a mobile device in cooperation with a server is provided, the method comprising: generating, by a processor, the template including local content; identifying in the template, by the processor, at least one location where a placeholder is to be added to indicate where dynamic content is to be inserted; adding the placeholder, by the processor, at the identified location in the template; and generating, by the processor, one or more representational state transfer services to be used to apply the dynamic content to the placeholder in cooperation with the server.

In another embodiment, a computer-implemented system for providing a template to be personalized by a mobile device in cooperation with a server is provided, the system comprising: a template generating element configured to generate the template including local content; an identifying element configured to identify in the template at least one location where a placeholder is to be added to indicate where dynamic content is to be inserted; an adding element configured to add the placeholder at the identified location in the template; and a services generating element configured to generate one or more representational state transfer services to be used to apply the dynamic content to the placeholder by the mobile device in cooperation with the server.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

The present disclosure relates generally to implementing a customizable mobile application utilizing a local template to personalize data. In one example, a local client application on a mobile device automatically changes the local content by utilizing a locally cached template and REST service supported by a remote application. In another example, the template further supports multiple phases of personalization.

For the purposes of describing and claiming the present invention the term "mobile device" is intended to refer to a device that can communicate data (e.g., receive, transmit) over a network and can be carried by a user. Examples include (but are not limited to): a mobile phone, a cellular phone, a smart phone, and/or a tablet.

For the purposes of describing and claiming the present invention the term "webpage" is intended to refer to the content shown in a user interface screen displayed by a web browser.

Figure 1:
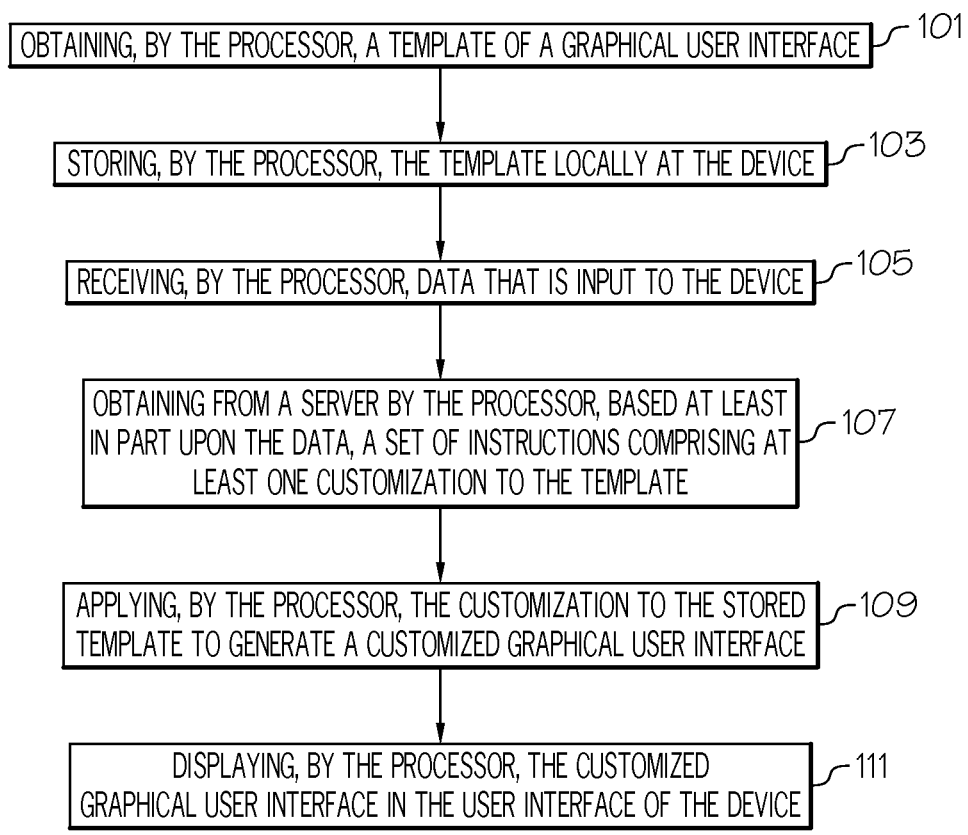
FIG. 1 depicts a flowchart of a method according to an embodiment.

Referring now to FIG. 1, a method for providing information to be displayed in a user interface of a device (e.g., a mobile device), wherein the device comprises a processor, is shown. As seen in this FIG. 1, the method of this embodiment comprises: at 101—obtaining, by the processor, a template of a graphical user interface; at 103—storing, by the processor, the template locally at the device; at 105—receiving, by the processor, data that is input to the device; at 107—obtaining from a server by the processor, based at least in part upon the data, a set of instructions comprising at least one customization to the template; at 109—applying, by the processor, the customization to the stored template to generate a customized graphical user interface; and at 111—displaying, by the processor, the customized graphical user interface in the user interface of the device.

In one example, the applying the customization may comprise hardcoding the customization into HTML code. In another example, the applying the customization may comprise embedding the customization into HTML code. In another example, the applying the customization may comprise saving data in a separate document to be merged with the template (e.g., HTML document) when rendered.

In another example, the customized graphical user interface may be saved (e.g., by being stored on the device). In one specific example, the customized graphical user interface may be saved in the form of an HTML document. In another specific example, the customized graphical user interface may be saved in the form of a template document. In one specific example, the customized graphical user interface may be saved in the form of a GUI document.

In another example, the above steps may be carried out in the order recited or the steps may be carried out in another order.

Figure 2:
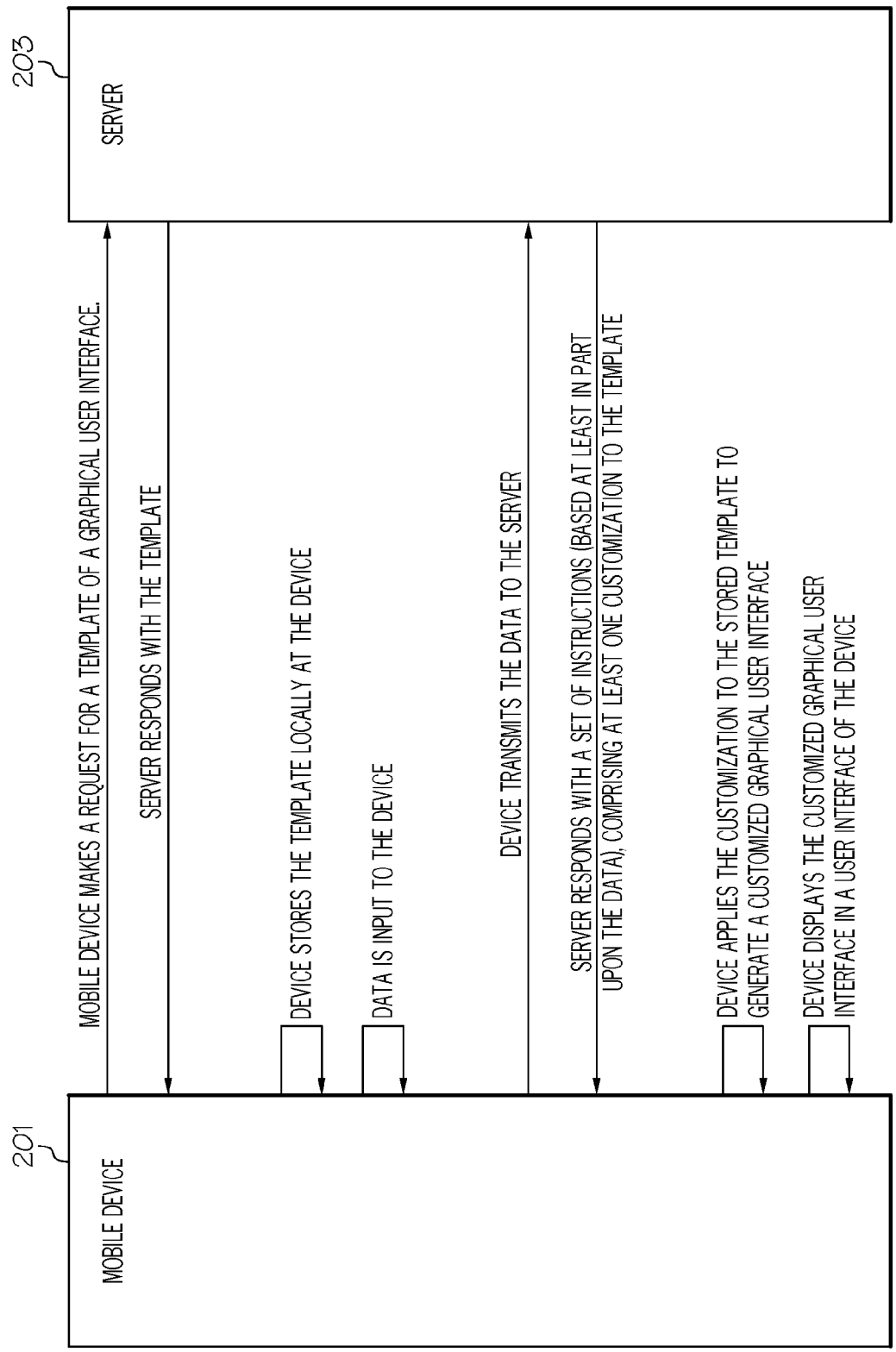
FIG. 2 depicts a diagram showing interaction between a mobile device and a server according to an embodiment.

Referring now to FIG. 2, a diagram showing interaction between a mobile device 201 and a server 203 according to an embodiment is shown. As seen, at (1) the mobile device makes a request for a template of a graphical user interface. At (2) the server responds with the template. At (3) the mobile device stores the template locally at the device (e.g., in a memory such as a solid state memory). At (4) data is input to the device (see, e.g., manually by a user and/or automatically by a component of the device (e.g., a GPS)). At (5) the device transmits the data (and/or other information based upon the data) to the server. At (6) the sever responds with a set of instructions (based at least in part upon the data and/or the other information), comprising at least one customization to the template. At (7) the device applies the customization to the stored template to generate a customized graphical user interface. At (8) the device displays the customized graphical user interface in a user interface of the device.

In one example, the above steps may be carried out in the order recited or the steps may be carried out in another order.

In another example, communication between the mobile device and the server of FIG. 2 may be carried out via the Internet, an intranet, a local area network, a wide area network and/or any other desired communication channel(s). In another example, some or all of these components may be implemented in a computer system of the type shown in FIG. 5.

Figure 3A:
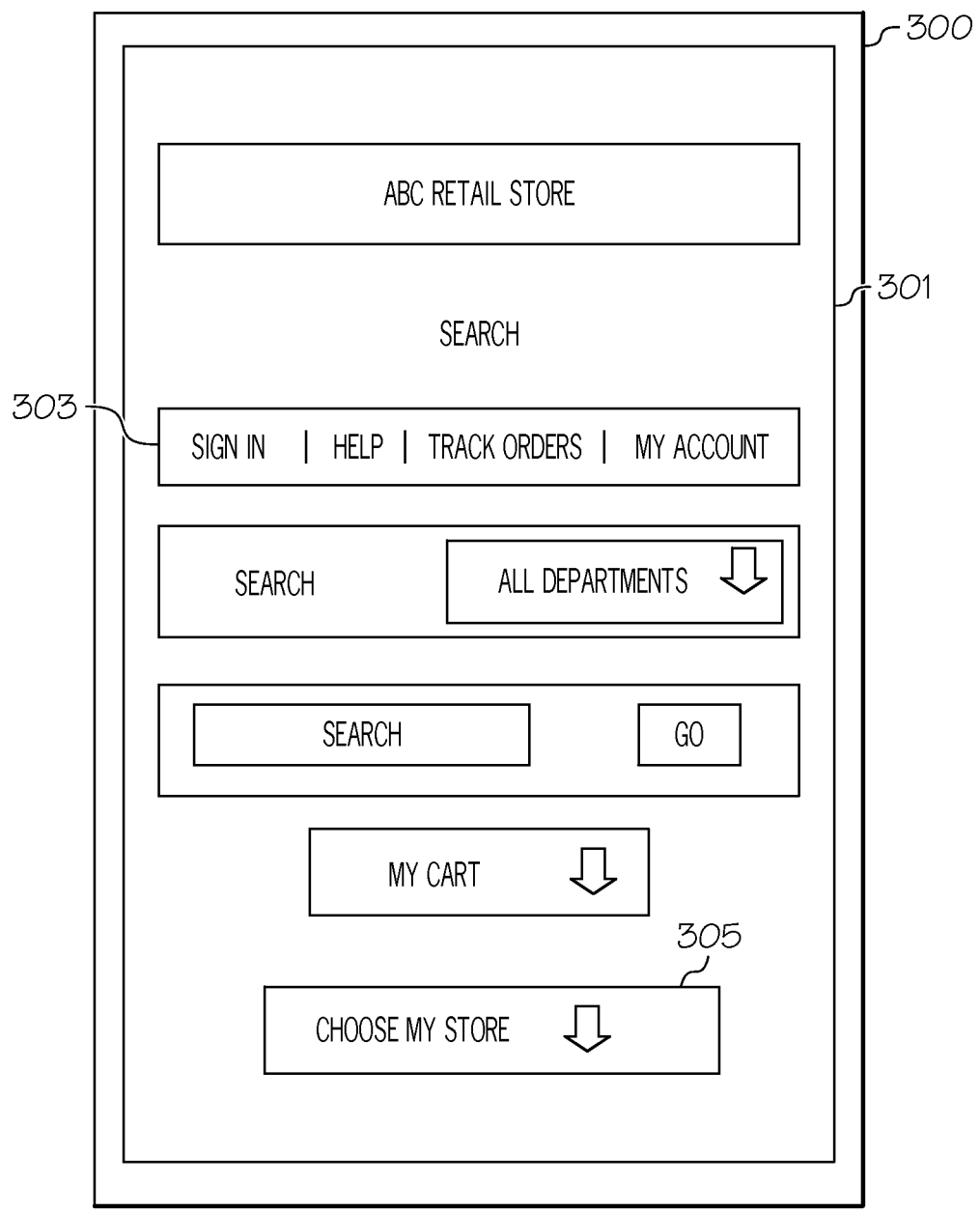
FIGS. 3A-3C depict various diagrams showing an example implementation of operation according to an embodiment.
Figure 3B:
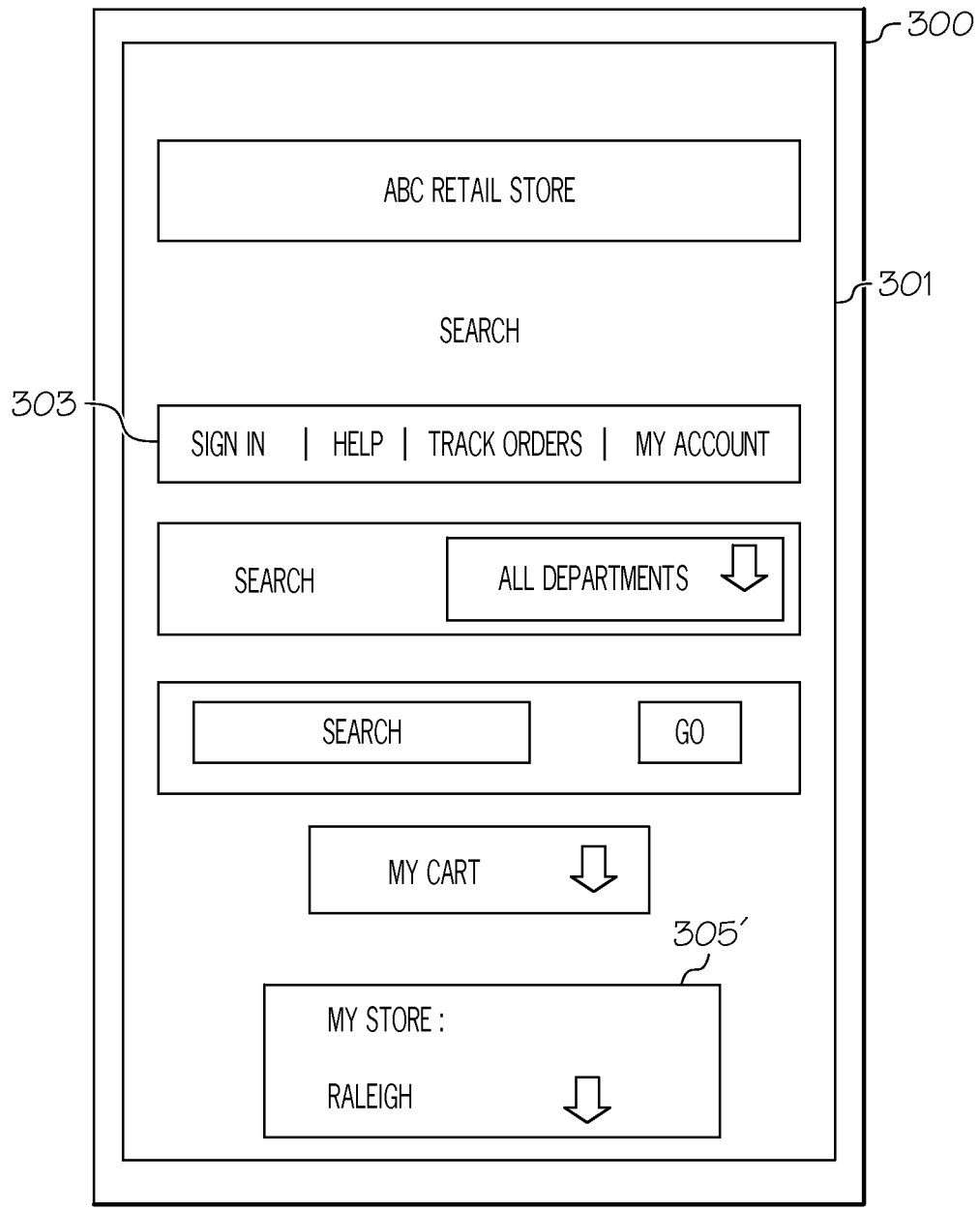
Figure 3C:
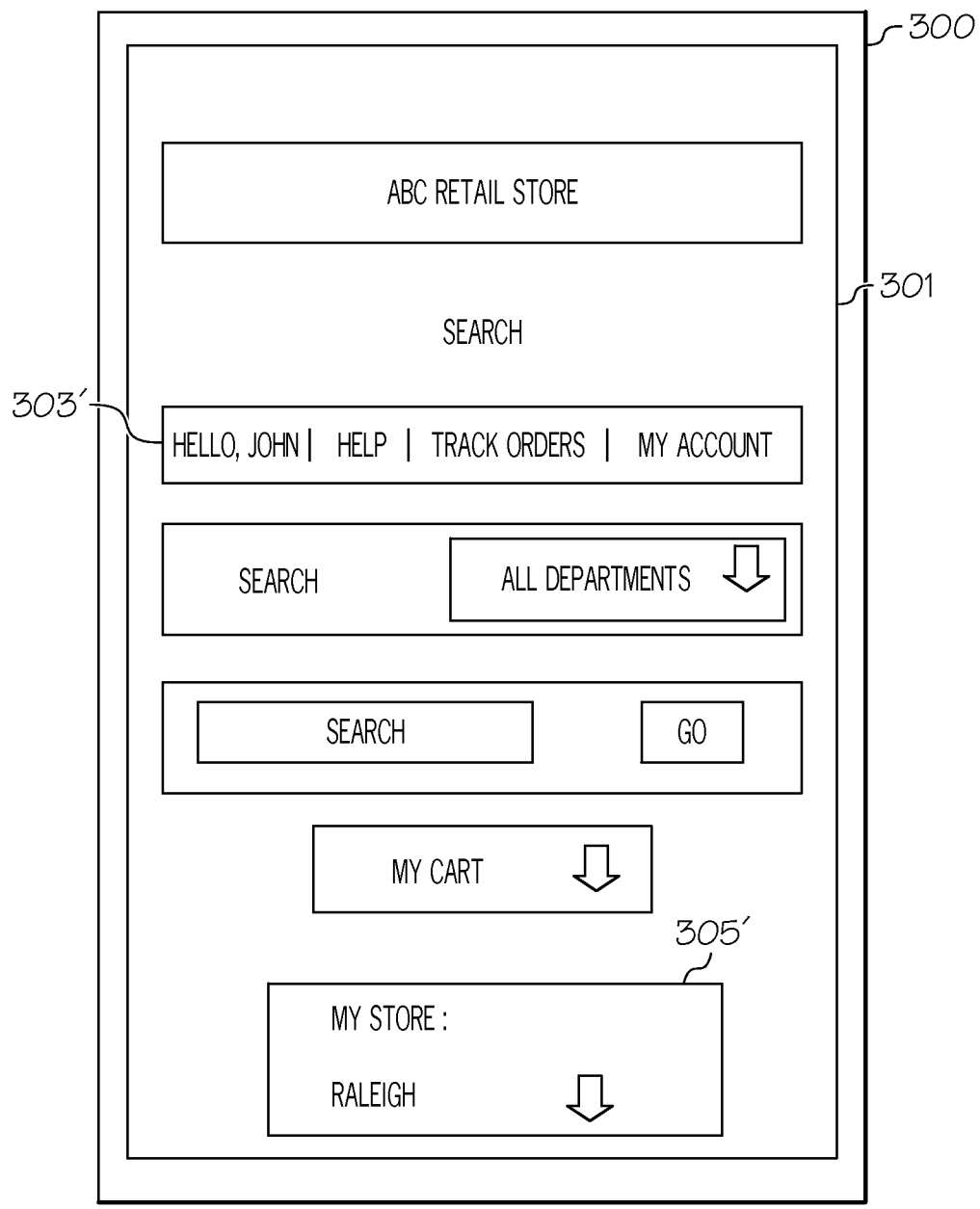

Referring now to FIGS. 3A-3C, an example implementation of operation according to one embodiment is shown. More particularly, with reference first to FIG. 3A, a mobile device 300 including a default, unpersonalized graphical user interface 301 (which is an example of a "template" as used herein) displaying information for a fictional retail store is shown (in one example, the graphical user interface may be part of a stand-alone mobile app; in another example, the graphical user interface may be part of a web browser). As seen, the example graphical user interface is directed to a search functionality and has various content, including header section 303 and my store selection section 305. These sections and this graphical user interface are, of course, provided as examples only, and any desired graphical user interface(s) and/or section(s) may be provided.

Referring now to FIG. 3B, it is seen that after geo-location data has been input to the device, after the geo-location data has been sent to a server and after the server has responded with customization instructions (see, e.g., FIG. 2 at steps (4)-(6)), the store selection section 305' of the graphical user interface (which corresponds to the store selection section 305 of FIG. 3A) is personalized (see, e.g., steps (7)-(8) of FIG. 2) with "My Store" information (in this example, "Raleigh). In one specific example, the geo-location data may be input to the device manually by a user (e.g., by entering city, zipcode or the like). In another example, the geo-location data may be input to the device automatically via an integrated GPS or other appropriate mechanism (e.g., base station identification). In another example, the graphical user interface transformation may be accomplished by sending the server the geo-location data in an Extensible Stylesheet Language Transformations (XSLT) format.

In one example, the default, unpersonalized graphical user interface 301 of FIG. 3A may be displayed first (e.g., before geo-location data has been input), followed by the customized graphical user interface of FIG. 3B (e.g., after geo-location data has been input). In another example, the customized graphical user interface of FIG. 3B is displayed instead of the default, unpersonalized graphical user interface 301 of FIG. 3A.

Referring now to FIG. 3C, it is seen that additional personalization may be performed. In particular, in this example, it is seen that after log-in credentials have been input to the device, after the log-in credentials have been sent to server and after the server has responded with additional customization instructions, the header section 303' of the graphical user interface (which corresponds to the header section 303 of FIG. 3A) is personalized with greeting information (in this example, "Hello, John"). In one specific example, the log-in credentials may be input to the device manually by a user. In another example, the graphical user interface transformation may be accomplished by sending the server the log-in credentials in an XSLT format.

Figure 4:
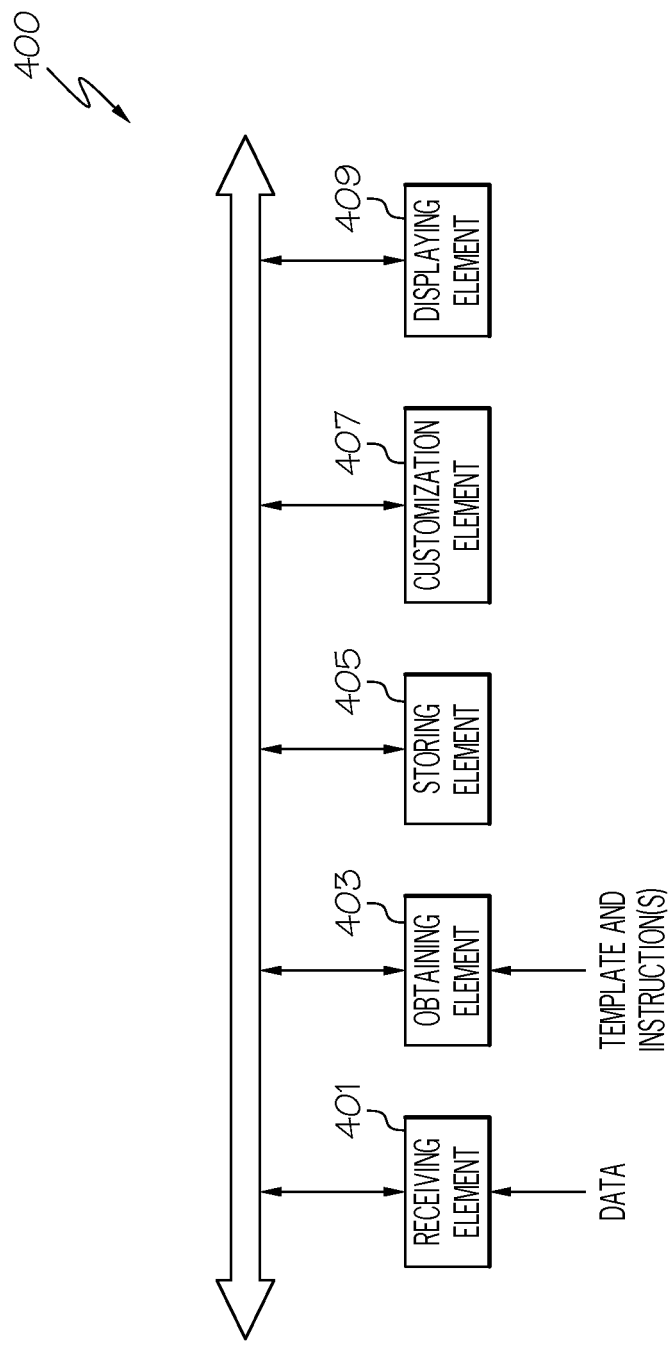
FIG. 4 depicts a block diagram of a system according to an embodiment.

Referring now to FIG. 4, a computer-implemented system 400 for providing information to be displayed in a user interface of a device is provided. This system may include the following elements: a receiving element 401 configured to receive data that is input to the device; an obtaining element 403 configured to obtain from a server: (a) a template of a graphical user interface; and (b) based at least in part upon the data, a set of instructions comprising at least one customization to the template; a storing element 405 in operative communication with the obtaining element configured to store the template locally at the device; a customization element 407 in operative communication with the obtaining element configured to apply the customization to the stored template to generate a customized graphical user interface; and a displaying element 409 in operative communication with the customization element configured to display the customized graphical user interface in the user interface of the device.

In one example, the receiving element is further configured to receive additional data that is input to the device; the obtaining element is further configured to obtain from the server, based at least in part upon the additional data, an additional set of instructions comprising at least one additional customization to the stored template; the customization element is further configured to apply the additional customization to the stored template to generate an additional customized graphical user interface; and the displaying element is further configured to display the additional customized graphical user interface in the user interface of the device.

In another example, communication between and among the various components of FIG. 4 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 5.

Figure 5:
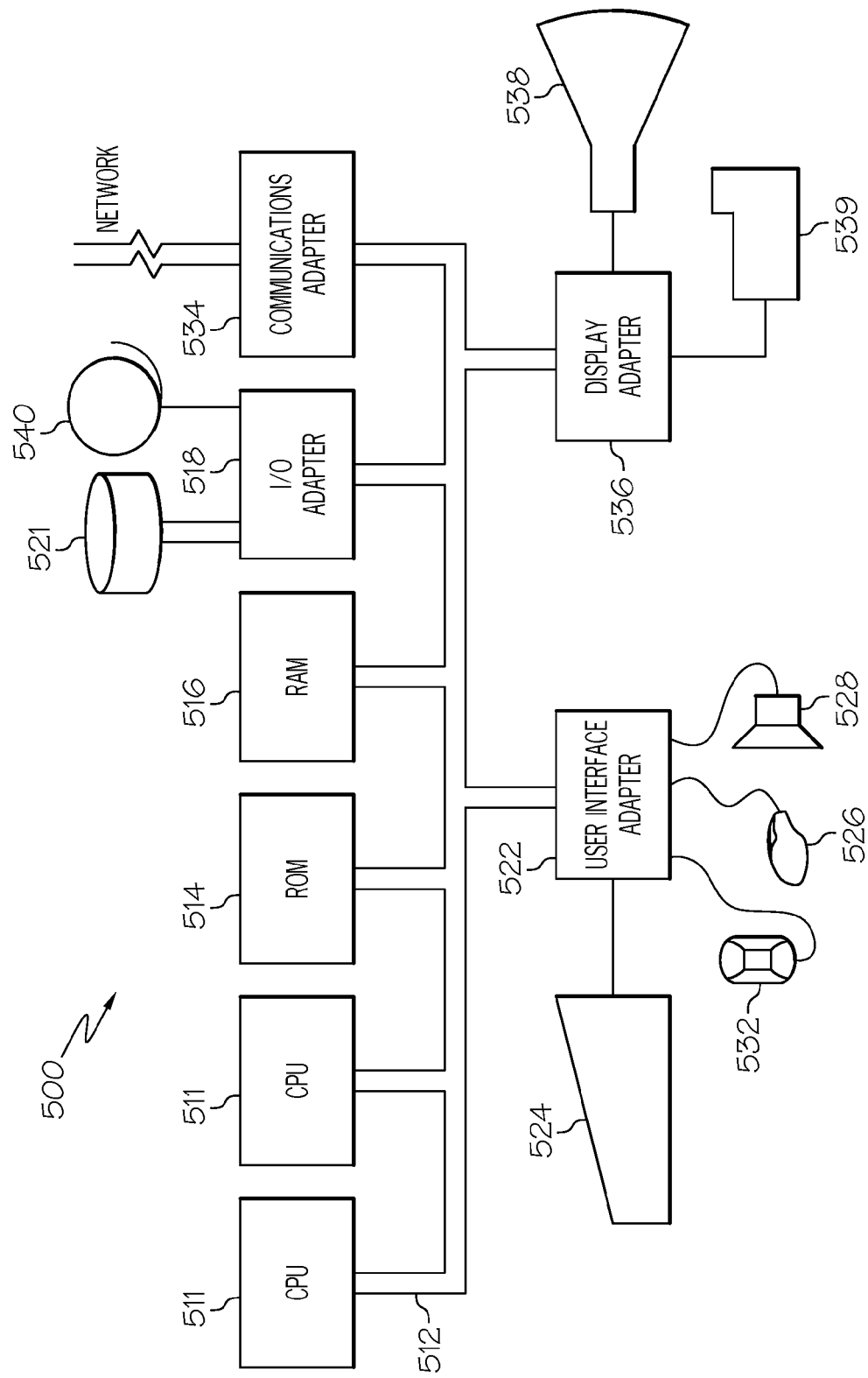
FIG. 5 depicts a block diagram of a system according to an embodiment.

Referring now to FIG. 5, this figure shows a hardware configuration of computing system 500 according to an embodiment of the present invention. As seen, this hardware configuration has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communications adapter 534 for connecting the system 500 to a data processing network, the Internet, an Intranet, a local area network (LAN), etc., and a display adapter 536 for connecting the bus 512 to a display device 538 and/or printer 539 (e.g., a digital printer or the like).

As described herein, mechanisms are provided which allow local HTML content to be personalized using locally cached templates (the personalization may be accomplished, for example, using information that is provided by an external set of data). In various example, the local application (e.g., HTML application) being accessed will allow for some input such as entering geo-location data (e.g., address, zip code, etc), entering login credentials, and/or other types of information which may influence the preferences of the user of the application (such as sports teams, food preferences, etc.). The local application will then contact a remote server with the input data (and potentially other variables like application version) and be provided back one or more customizations to be made to the local HTML. The application will then apply the customizations to the HTML transforming the HTML into a new personalized webpage or website.

In one specific example, the transformations could be done using XSLT (and/or any other appropriate technologies).

In another specific example, multiple transformations can occur on a given template (e.g., set of HTML) over time. In another specific example, each template associated with each of the multiple transformations may be saved. In another specific example, the template associated with the final one of the multiple transformations may be saved. In another specific example, the transformations can be reversed (e.g., if information is cleared and/or an event like a logout occurs).

In another specific example, some applications may keep the transformed personalized content only in short-term volatile memory (as opposed to long-term non-volatile memory) in cases where a logout is required each time.

In another example, a method for converting an existing web application to a mobile application comprises: converting a web application to a mobile web application by parsing and separating the web application into static content and a dynamic content with data sources; rendering the static content as hypertext markup language (HTML) pages with the links between the HTML pages converted to local links and references to dynamic content changed to Representational State Transfer (REST) requests; utilizing a mobile gateway on a remote server for accessing the dynamic content with the data sources; converting a section of a webpage for the mobile web application into a set of separate webpages (views); packaging the views into the mobile web application; and installing the mobile web application on a mobile device.

In another example, a series of templates may be provided. Each template may have one or more placeholders to indicate where dynamic content could be inserted by one or more REST interfaces (see, e.g., 305' and 303' of FIG. 3C showing placeholders for the geo-location and user identity fields).

In one specific example, there are a finite number of templates in the web space that satisfy the vast majority of websites. Templates may be provided for the most common mobile user cases and based upon the customizations (e.g., the dynamic content placeholders) provide holding places for retrieving RESTful data from the enterprise services.

In another example, in order to create a personalization template, tooling is provided that allows personalization placeholder(s) to be entered, a template created, and one or more REST services to be generated which provide personalized data.

As described herein, an example of what is meant by "tooling" is a graphical software tool that provides a "What you see is what you get" type of development experience. Using such tools you can, for example, point to an existing web site and drag and drop the components/widgets of the page to form a "mobile view". Once you have this, you can then decide, for example, which parts can be deemed dynamic and would require the developer to connect to a server to get the data (userid of a user would be one example).

In one example, the dynamic aspects may be identified (e.g., automatically by the tooling) by the syntax defined by JSPs (similar notions exist in PHP as well). For example, the JSP tag <% %> allows the insertion of scripts (or code snippets) and the <%=%> tag allows the output of dynamic content. These hints may be used to automatically extract out these elements and generate a RESTful service.

In another specific example, a template for providing transformations with an application that works with personalized content may be provided. In one specific example, an implementation may be as follows: (1) Automatically generating the template based on some introspection of the content changes which will occur after personalization data is entered; (2) Automatically generating a REST service which provides the personalized data needed for the template to provide the transformations; (3) Providing a client application infrastructure which automatically transforms HTML content into personalized content using the template; (4) Providing (e.g., the infrastructure) with policies which allow the personalized content to be persisted, kept for a single session only, and/or to be available for a set amount of time.

In another specific example, templates may be provided which allow for multiple phases of personalization to occur including (but not limited to): log-in credentials, geo-location, sports team preferences, food preferences, new topic preferences, product brand preferences, and/or product shipping preferences.

In another specific example, an infrastructure may be provided that will allow for multiple phases of personalization to be applied and/or removed.

In another specific example, an implementation may be as follows: Step 1: User utilizes tooling to prepackage web artifacts into an application (in this example, the application is a mobile retail store). Step 2: User either generates a template or uses the tooling to generate the template based on a running web application (e.g., in the form of default HTML). For the purposes of this example, it will be assumed that a running web application was accessed remotely and that the tooling is used to generate the template and REST service(s). Step 3: Tooling is used to capture changes which occur for each personalized content addition (for example, geo-location is added and a template is created for when geo-location data is provided in order to personalize what is available in local stores; another example is that the user may log-in which allows the user to have a new button for "my orders" in addition to adding shipping preferences to the cart.) These personalization differences are used to create templates which help transform the generic default web artifacts to personalized ones. Step 4: The tooling helps generate REST service(s) for each template's personalized data. The tooling allows the user to optimize how this data is fetched (e.g., rather than fetching the data from a web generated request). Step 5: Each of the template(s) are bundled in the application with the transformation infrastructure. Policies are set as to how long personalization information will be kept. Step 6: The application is provided to customers. Step 7: When the application is loaded, it would initially come up with the default non-transformed unpersonalized data (and then personalization would be applied as described herein).

As described herein, a method (and associated system and algorithm) are provided for transforming a local application having local content into transformed content from a remote application (e.g., external source, server, cloud source) utilizing local templates. The method of one example comprises: providing a template for transforming local content to personalized content for a local (e.g., client) application; generating REST services needed for the template to transform the content; providing a client application infrastructure which automatically changes the local context utilizing the template and the REST services supported by a remote application; and utilizing the client application infrastructure to transform the local application to utilize the personalized content.

Figure 6:
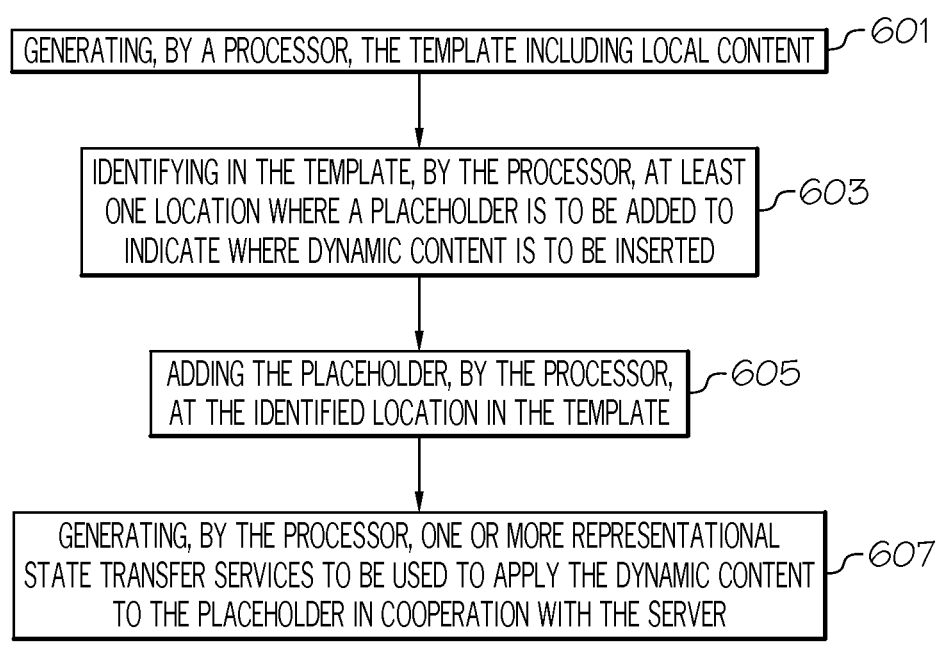
FIG. 6 depicts a flowchart of a method according to an embodiment.

Referring now to FIG. 6, a method for providing a template to be personalized by a mobile device in cooperation with a server is shown. As seen in this FIG. 6, the method of this embodiment comprises: at 601—generating, by a processor, the template including local content; at 603—identifying in the template, by the processor, at least one location where a placeholder is to be added to indicate where dynamic content is to be inserted; at 605—adding the placeholder, by the processor, at the identified location in the template; and at 607—generating, by the processor, one or more representational state transfer services to be used to apply the dynamic content to the placeholder in cooperation with the server.

In another example, the above steps may be carried out in the order recited or the steps may be carried out in another order.

Figure 7:
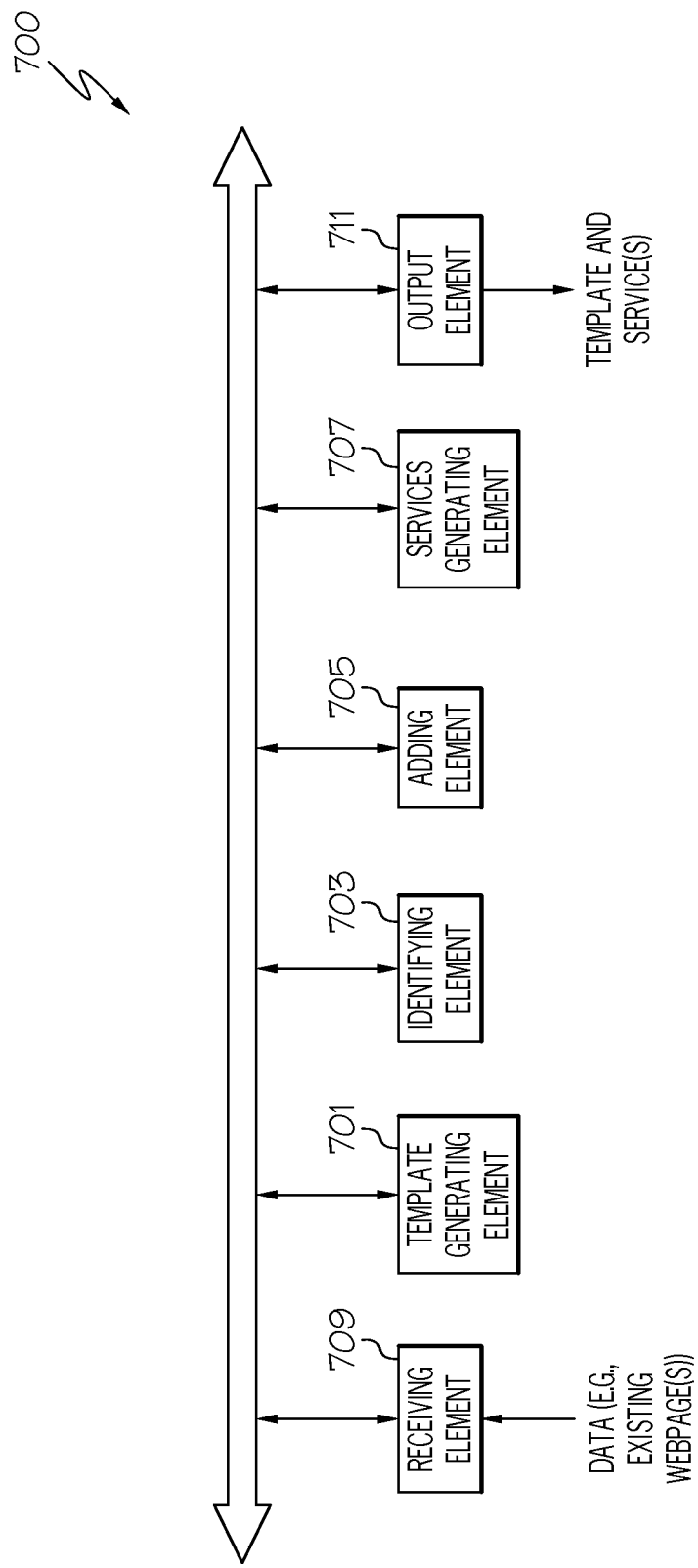
FIG. 7 depicts a block diagram of a system according to an embodiment.

Referring now to FIG. 7, a computer-implemented system 700 for providing a template to be personalized by a mobile device in cooperation with a server is provided. This system may include the following elements: a template generating element 701 configured to generate the template including local content; an identifying element 703 configured to identify in the template at least one location where a placeholder is to be added to indicate where dynamic content is to be inserted; an adding element 705 configured to add the placeholder at the identified location in the template; and a services generating element 707 configured to generate one or more representational state transfer services to be used to apply the dynamic content to the placeholder by the mobile device in cooperation with the server.

Further, as seen, the system 700 may include receiving element 709 for receiving data. In one specific example, the receiving element receives one or more existing webpages. In another specific example, the received webpage(s) may be used as a basis for generating one or more templates.

In addition, as seen, the system 700 may include output element 711 for outputting data. In one specific example, the output element outputs one or more templates and/or one or more services (e.g., REST services).

In another example, communication between and among the various components of FIG. 7 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 5.

In one specific example, the local content is selected from a group including (but not limited to): HTML, CSS, and/or JavaScript.

In another specific example, the template is generated based on personalization data entered by a user.

In another specific example, the template further comprises: supporting multiple phases of personalization selected from a group including (but not limited to): login credentials, geo-location, sports team preferences, food preferences, new topic preferences, product brand preferences, and/or product shipping preferences.

In another specific example, mechanisms may be provided for supporting a policy for handling personalized data selected from a group including (but not limited to): persistent, single session, and persistent for an elapsed time.

As described herein, fetching of data from a remote server may be used to customize a local application (e.g., transforming local application content into personalized content based upon instruction(s) which are fetched from an external server).

In one specific example, mechanisms may be provided for transforming application cached HTML into personalized content.

As described herein, various embodiments may be provided in the context of WEBSPHERE.

As described herein, various embodiments may be provided in the context of dynamic aggregation and personalization.

As described herein, various mechanisms may provide for: (a) local HTML transformations for personalization; (b) mobile HTML transformations for personalization; (c) personalizing cached HTML content; (d) personalizing stored HTML content; (e) personalization through transformation of HTML content; and/or (f) personalization through transformation of cached HTML content.

As described herein, various embodiments may be provided in the context of: (a) Converged Communications Mobile applications; (b) Software: Application development software; (c) Software: Application server middleware; (d) Web technology: Content management and use; (e) Web technology: Pervasive; and/or (f) Web technology: Wireless.

As described herein, mechanisms are provided to enable a user to change a user interface of one or more HTML pages using one or more templates.

As described herein, mechanisms are provided to enable a server to provide to a device (e.g., a mobile device) a list of transformations that can be run on one or more HTML pages. In one specific example, one or more RESTful services may be run on the one or more HTML pages.

In one embodiment, a computer readable storage medium, tangibly embodying a program of instructions executable by a device for providing information to be displayed in a user interface of the device is provided, the program of instructions, when executing, performing the following steps: obtaining a template of a graphical user interface; storing the template locally at the device; receiving data that is input to the device; obtaining from a server, based at least in part upon the data, a set of instructions comprising at least one customization to the template; applying the customization to the stored template to generate a customized graphical user interface; and displaying the customized graphical user interface in the user interface of the device.

In one example, the graphical user interface is provided in one or more of: (a) a mobile app; or (b) a web browser; or (c) a combination thereof.

In another example, the template is received from the server.

In another example, the template is received from the server after a request for the template is transmitted to the server from the device.

In another example, the set of instructions is received from the server.

In another example, the set of instructions is received from the server after a request for the set of instructions is transmitted to the server from the device.

In another example, the data comprises input from a user.

In another example, the data comprises input from a component of the device.

In another example, the component of the device comprises a GPS receiver.

In another example, the set of instructions comprises a plurality of instructions.

In another example, the set of instructions comprises a single instruction.

In another example, the at least one customization comprises a plurality of customizations.

In another example, the at least one customization comprises a single customization.

In another example, the program of instructions, when executing, further performs the steps of: receiving additional data that is input to the device; obtaining from the server, based at least in part upon the additional data, an additional set of instructions comprising at least one additional customization to the template; applying the additional customization to the stored template to generate an additional customized graphical user interface; and displaying the additional customized graphical user interface in the user interface of the device.

In another example, the data is transmitted to the server from the device in order to obtain the set of instructions from the server.

In another example, the device comprises a mobile device.

In another embodiment, a method for providing information to be displayed in a user interface of a device is provided, wherein the device comprises a processor, the method comprising: obtaining, by the processor, a template of a graphical user interface; storing, by the processor, the template locally at the device; receiving, by the processor, data that is input to the device; obtaining from a server by the processor, based at least in part upon the data, a set of instructions comprising at least one customization to the template; applying, by the processor, the customization to the stored template to generate a customized graphical user interface; and displaying, by the processor, the customized graphical user interface to in the user interface of the device.

In one example, the device comprises a mobile device.

In another embodiment, a computer-implemented system for providing information to be displayed in a user interface of a device is provided, the system comprising: a receiving element configured to receive data that is input to the device; an obtaining element configured to obtain from a server: (a) a template of a graphical user interface; and (b) based at least in part upon the data, a set of instructions comprising at least one customization to the template; a storing element in operative communication with the obtaining element configured to store the template locally at the device; a customization element in operative communication with the obtaining element configured to apply the customization to the stored template to generate a customized graphical user interface; and a displaying element in operative communication with the customization element configured to display the customized graphical user interface in the user interface of the device.

In one example: the receiving element is further configured to receive additional data that is input to the device; the obtaining element is further configured to obtain from the server, based at least in part upon the additional data, an additional set of instructions comprising at least one additional customization to the stored template; the customization element is further configured to apply the additional customization to the stored template to generate an additional customized graphical user interface; and the displaying element is further configured to display the additional customized graphical user interface in the user interface of the device.

In another example, the device comprises a mobile device.

In one embodiment, a computer readable storage medium, tangibly embodying a program of instructions executable by the computer for providing a template to be personalized by a mobile device in cooperation with a server is provided, the program of instructions, when executing, performing the following steps: generating the template including local content; identifying in the template at least one location where a placeholder is to be added to indicate where dynamic content is to be inserted; adding the placeholder at the identified location in the template; and generating one or more representational state transfer services to be used to apply the dynamic content to the placeholder by the mobile device in cooperation with the server.

In one example, the local content is selected from one or more of: (a) HTML; (b) CSS; (c) JavaScript; and (d) any combination thereof.

In another example, the template supports multiple phases of personalization selected from one or more of: (a) login credentials; (b) geo-location; (c) sports team preferences; (d) food preferences; (e) new topic preferences; (f) product brand preferences; (g) product shipping preferences; and (h) any combination thereof.

In another example, the template is provided to the mobile device in one or more of: (a) a mobile app; or (b) a web browser; or (c) a combination thereof.

In another example, the template is received from the server.

In another example, the template is received from the server after a request for the template is transmitted to the server from the mobile device.

In another example, the dynamic content is based at least in part upon input from a user.

In another example, the dynamic content is based at least in part upon input from a component of the mobile device.

In another example, the component of the mobile device comprises a GPS receiver.

In another embodiment, a method for providing a template to be personalized by a mobile device in cooperation with a server is provided, the method comprising: generating, by a processor, the template including local content; identifying in the template, by the processor, at least one location where a placeholder is to be added to indicate where dynamic content is to be inserted; adding the placeholder, by the processor, at the identified location in the template; and generating, by the processor, one or more representational state transfer services to be used to apply the dynamic content to the placeholder in cooperation with the server.

In one example, the local content is selected from one or more of: (a) HTML; (b) CSS; (c) JavaScript; and (d) any combination thereof.

In another example, the template supports multiple phases of personalization selected from one or more of: (a) login credentials; (b) geo-location; (c) sports team preferences; (d) food preferences; (e) new topic preferences; (f) product brand preferences; (g) product shipping preferences; and (h) any combination thereof.

In another example, the template is provided to the mobile device in one or more of: (a) a mobile app; or (b) a web browser; or (c) a combination thereof.

In another example, the template is received from the server.

In another example, the template is received from the server after a request for the template is transmitted to the server from the mobile device.

In another example, the dynamic content is based at least in part upon input from a user.

In another example, the dynamic content is based at least in part upon input from a component of the mobile device.

In another example, the component of the mobile device comprises a GPS receiver.

In another embodiment, a computer-implemented system for providing a template to be personalized by a mobile device in cooperation with a server is provided, the system comprising: a template generating element configured to generate the template including local content; an identifying element configured to identify in the template at least one location where a placeholder is to be added to indicate where dynamic content is to be inserted; an adding element configured to add the placeholder at the identified location in the template; and a services generating element configured to generate one or more representational state transfer services to be used to apply the dynamic content to the placeholder by the mobile device in cooperation with the server.

In one example, the local content is selected from one or more of: (a) HTML; (b) CSS; (c) JavaScript; and (d) any combination thereof.

In another example, the template supports multiple phases of personalization selected from one or more of: (a) login credentials; (b) geo-location; (c) sports team preferences; (d) food preferences; (e) new topic preferences; (f) product brand preferences; (g) product shipping preferences; and (h) any combination thereof.

In another example, the template is provided to the mobile device in one or more of: (a) a mobile app; or (b) a web browser; or (c) a combination thereof.

In another example, the template is received from the server.

In another example, the template is received from the server after a request for the template is transmitted to the server from the mobile device.

In another example, the dynamic content is based at least in part upon input from a user.

In another example, the dynamic content is based at least in part upon input from a component of the mobile device.

In another example, the component of the mobile device comprises a GPS receiver.

In other examples, any steps described herein may be carried out in any appropriate desired order.

Another example related to REST operation is as follows. There are the client side API calls that are in javascript form and the server side (hosted where the original JSPS were located) that host the REST services that communicate with the databases and other enterprise data services.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A computer readable storage medium, tangibly embodying a program of instructions executable by a server for providing a template to be personalized by a mobile device in cooperation with the server, the program of instructions, when executing, performing the following steps:
   receiving from the mobile device a request for the template;
   generating the template including local content;
   identifying in the template at least one location where a placeholder is to be added to indicate where dynamic content is to be inserted;
   adding the placeholder at the identified location in the template;
   sending to the mobile device the template, wherein the template is stored at the mobile device;
   receiving from the mobile device data;
   generating based at least in part upon the data received from the mobile device one or more representational state transfer services;
   sending to the mobile device the one or more representational state transfer services to be used by the mobile device to apply the dynamic content to the placeholder of the stored template in cooperation with the server in order to provide a personalized template for generating a customized graphical user interface; and
   storing, in cases where a logout is required each time, the personalized template in a volatile memory of the mobile device without storing the personalized template in a non-volatile memory of the mobile device.

2. The computer readable storage medium of claim 1, wherein the local content is selected from one or more of: (a) HTML; (b) CSS; (c) JavaScript; and (d) any combination thereof.

3. The computer readable storage medium of claim 1, wherein the template supports personalization based on geolocation.

4. The computer readable storage medium of claim 1, wherein the template is sent to the mobile device in one or more of: (a) a mobile app; (b) a web browser; and (c) a combination thereof.

5. The computer readable storage medium of claim 1, wherein the dynamic content is based at least in part upon input from a user.

6. The computer readable storage medium of claim 1, wherein the dynamic content is based at least in part upon input from a component of the mobile device.

7. The computer readable storage medium of claim 6, wherein the component of the mobile device comprises a GPS receiver.

8. The computer readable storage medium of claim 1, wherein the template supports personalization based on login credentials.

9. The computer readable storage medium of claim 1, wherein the template supports personalization based on sports team preferences.

10. The computer readable storage medium of claim 1, wherein the template supports personalization based on food preferences.

11. The computer readable storage medium of claim 1, wherein the template supports personalization based on new topic preferences.

12. The computer readable storage medium of claim 1, wherein the template supports personalization based on product brand preferences.

13. The computer readable storage medium of claim 1, wherein the template supports personalization based on product shipping preferences.

14. A computer-implemented system for providing a template to be personalized by a mobile device in cooperation with a server, the system comprising:
   a processor; and
   a memory storing computer readable instructions that, when executed by the processor, implement:
   receiving from the mobile device a request for the template;
   generating the template including local content;
   identifying in the template at least one location where a placeholder is to be added to indicate where dynamic content is to be inserted;
   adding the placeholder at the identified location in the template;
   sending to the mobile device the template, wherein the template is stored at the mobile device;
   receiving from the mobile device data;
   generating based at least in part upon the data received from the mobile device one or more representational state transfer services;
   sending to the mobile device the one or more representational state transfer services to be used by the mobile device to apply the dynamic content to the placeholder of the stored template in cooperation with the server in order to provide a personalized template for generating a customized graphical user interface; and
   storing, in cases where a logout is required each time, the personalized template in a volatile memory of the mobile device without storing the personalized template in a non-volatile memory of the mobile device.

15. The system of claim 14, wherein the local content is selected from one or more of (a) HTML; (b) CSS; (c) JavaScript; and (d) any combination thereof.

16. The system of claim 14, wherein the template supports personalization based on geo-location.

17. The system of claim 14, wherein the template is sent to the mobile device in one or more of: (a) a mobile app; (b) a web browser; and (c) a combination thereof.

18. The system of claim 14, wherein the dynamic content is based at least in part upon input from a user.

19. The system of claim 14, wherein the dynamic content is based at least in part upon input from a component of the mobile device.

20. The system of claim 19, wherein the component of the mobile device comprises a GPS receiver.

* * * * *